(12) United States Patent
Radakovic et al.

(10) Patent No.: US 8,392,816 B2
(45) Date of Patent: Mar. 5, 2013

(54) PAGE CLASSIFIER ENGINE

(75) Inventors: Bogdan Radakovic, Kladovo (RS);
Aleksandar Uzelac, Krusevac (RS);
Bodin Dresevic, Bellevue, WA (US);
Oren Trutner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1074 days.

(21) Appl. No.: 11/949,586

(22) Filed: Dec. 3, 2007

(65) Prior Publication Data

US 2009/0144605 A1 Jun. 4, 2009

(51) Int. Cl.
*G06F 17/21* (2006.01)

(52) U.S. Cl. ....................................... 715/200

(58) Field of Classification Search ................... 715/200
See application file for complete search history.

(56) References Cited

U.S. PATENT DOCUMENTS

| | | |
|---|---|---|
| 5,276,616 A | 1/1994 | Kuga |
| 5,845,305 A | 12/1998 | Kujiraoka |
| 5,963,205 A | 10/1999 | Sotomayor |
| 6,055,544 A | 4/2000 | DeRose et al. |
| 6,192,360 B1 | 2/2001 | Dumais et al. |
| 6,295,543 B1 | 9/2001 | Block et al. |
| 6,510,425 B1 | 1/2003 | Okamoto |
| 6,728,403 B1 | 4/2004 | Jang et al. |
| 6,769,096 B1 | 7/2004 | Kuppusamy et al. |
| 6,823,492 B1 | 11/2004 | Ambroziak |
| 6,907,431 B2 | 6/2005 | Lin |
| 7,028,250 B2 | 4/2006 | Ukrainczyk et al. |
| 7,051,277 B2 | 5/2006 | Kephart et al. |
| 7,137,062 B2 | 11/2006 | Kaufman |
| 7,236,966 B1 | 6/2007 | Jackson et al. |
| 7,397,468 B2* | 7/2008 | Braun et al. .................. 345/179 |
| 7,555,711 B2 | 6/2009 | Chao et al. |
| 7,743,327 B2 | 6/2010 | Meunier et al. |
| 7,801,358 B2* | 9/2010 | Furmaniak et al. ........... 382/180 |
| 7,853,866 B2* | 12/2010 | Tanaka .......................... 715/205 |
| 7,912,829 B1 | 3/2011 | Mathes et al. |
| 2002/0010719 A1 | 1/2002 | Kupiec |
| 2002/0143823 A1 | 10/2002 | Stevens |
| 2003/0042319 A1 | 3/2003 | Moore |
| 2003/0078663 A1* | 4/2003 | Ralph et al. ................ 623/17.13 |
| 2003/0208502 A1* | 11/2003 | Lin ............................... 707/101 |

(Continued)

FOREIGN PATENT DOCUMENTS

EP 1139253 A1 10/2001

OTHER PUBLICATIONS

Fabrizio Sebastiani, "Machine Learning in Automated Text Categorization", ACM Computing Surveys, 2002, pp. 1-47.*

(Continued)

*Primary Examiner* — Doug Hutton, Jr.
*Assistant Examiner* — Andrew Dyer
(74) *Attorney, Agent, or Firm* — Shook Hardy & Bacon L.L.P.

(57) ABSTRACT

Embodiments of the present invention relate to classifying pages of an electronic document, such as a scanned book page. OCR software is applied to the contents of the electronic document, revealing semantic information about the content of the electronic document. Software-based features are applied to the semantic information to determine the type of page the electronic document is. Page types may include table of contents (TOC), table of figures (TOF), bibliography, index, or other types of pages commonly found in a book, magazine, or other publication. Once determined, the determined page type is stored and used by other software engines.

15 Claims, 5 Drawing Sheets

U.S. PATENT DOCUMENTS

| | | |
|---|---|---|
| 2003/0229854 A1 | 12/2003 | Lemay |
| 2004/0061690 A1 | 4/2004 | Braue et al. |
| 2004/0139384 A1* | 7/2004 | Lin .............................. 715/500 |
| 2005/0066267 A1 | 3/2005 | Kanai |
| 2005/0076000 A1 | 4/2005 | Sweet |
| 2005/0125402 A1 | 6/2005 | Viola et al. |
| 2005/0166143 A1 | 7/2005 | Howell |
| 2005/0289182 A1 | 12/2005 | Pandian et al. |
| 2006/0047682 A1 | 3/2006 | Black |
| 2006/0080309 A1* | 4/2006 | Yacoub et al. .................... 707/4 |
| 2006/0155703 A1 | 7/2006 | Dejean et al. |
| 2006/0282760 A1 | 12/2006 | Tanaka |
| 2006/0288279 A1 | 12/2006 | Yacoub et al. |
| 2006/0294460 A1 | 12/2006 | Chao et al. |
| 2007/0013968 A1 | 1/2007 | Ebaugh et al. |
| 2007/0028166 A1 | 2/2007 | Hundhausen et al. |
| 2007/0055931 A1 | 3/2007 | Zaima et al. |
| 2007/0101259 A1 | 5/2007 | Grigoriadis et al. |
| 2007/0196015 A1 | 8/2007 | Meunier et al. |
| 2008/0056575 A1* | 3/2008 | Behm et al. ................... 382/180 |
| 2008/0114757 A1* | 5/2008 | Dejean et al. ..................... 707/6 |
| 2008/0229828 A1* | 9/2008 | Buschman et al. .............. 73/579 |
| 2009/0083677 A1 | 3/2009 | Darwish et al. |
| 2009/0144605 A1 | 6/2009 | Radakovic et al. |
| 2009/0144614 A1 | 6/2009 | Dresevic et al. |

OTHER PUBLICATIONS

Dejean et al., Structuring Documents According to Their Table of Contents; DocEng '0g; Nov. 2-4, 2005; ACM; pp. 2-9.*

PDF Reference: Adobe Portable Document Format Version 1.4; 2001; Addison-Wesley; 3rd Edition; pp. 132-137.*

Gravenhorst, docWORKS/METAe Automated Conversion of Printed Documents Into Fully Tagged Mets Objects; Apr. 2004; METS Opening Day West; pp. 1-30.*

Dejean et al., Structuring Documents According to Their Table of Contents; DocEng '05; Nov. 2-4, 2005; ACM; pp. 2-9.*

Paul McFedries; Formulas and Function with Microsoft Excel 2003; Jun. 11, 2004; Que Publishing; p. 7.*

Ellen Riloff, et al., Information Extraction as a Basis for High-Precision Text Classification, http://delivery.acm.org/10.1145/190000/183428/p296-riloff.pdf?key1=183428&key2=3865957811&coll=GUIDE&dl=GUIDE&CFID=32271573&CFTOKEN=95265826; ACM Transactions on Information Systems, vol. 12, No. 3, Jul. 1994, pp. 296-333.

Xiaonan Lu, et al., Intelligent Parsing of Scanned Volumes for Web Based Archives, http://infolab.stanford.edu/~wangz/project/imsearch/DOCIMG/ICSC07/lu.pdf.

S. Mandal, et al., Automated Detection and Segmentation of Table of Contents Page and Index Pages From Document Images, http://csdl2.computer.org/persagen/DLAbsToc.jsp?resourcePath=/dl/proceedings/&toc=comp/proceedings/iciap/2003/1948/00/1948toc.xml&DOI=10.1109/ICIAP.2003.1234052; ICIAP (2003) p. 213, 12th International Conference on Image Analysis and Processing.

Final Office Action in U.S. Appl. No. 11/949,501 mailed Dec. 23, 2011, 43 pages.

Office Action in U.S. Appl. No. 11/949,537 mailed Dec. 22, 2010, 39 pages.

Jankun-Kelly et al., "A Spreadsheet Interface for Visualization Exploration", ACM, 2009, pp. 69-77.

Arturo Crespo, Jan Jannink, Erich Neuhold, Michael Rys, and Rudi Studer, "A Survey of Semi-Automatic Extraction and Transformation," pp. 1-19, 1994, copyright 1994 Elsevier Science Ltd, Printed in Great Britain, All rights reserved 0306-4379/94, http://infolab.stanford.edu/~crespo/publications/extract.ps, 19 pages.

Boalt Law Library Computer Lab, Creating a Table of Contents, www.law.berkeley.edu/library/computing/toc-pdf, 5 pages.

University of Wisconsin-Eau Claire, Generating a Table of Contents, www.uwec.edu/help/Word03/AUTO-toc.htm, 4 pages.

University of Florida College of Liberal Arts & Sciences, LaTeX: Table of Contents, http://web.image.ufl.edu/help/latex/toc.shtml, 2 pages.

Office Action in U.S. Appl. No. 11/949,501 mailed Apr. 22, 2011, 35 pages.

Detection and Segmentation of Tables and MathZones from Document Images, S. Mandal, S.P. Chowdhury, A.K. Das (2006 ACM), 6 pages.

Part-of Speech Tagging for Table of Contents Recognition, A. Belaid, L. Pierron and N. Valverde (2000 IEEE), 4 pages.

Office Action in U.S. Appl. No. 11/949,537 mailed on Jun. 9, 2011, 37 pages.

Notice of Allowance U.S. Appl. No. 11/949,537 dated Apr. 12, 2012, 44 pages.

* cited by examiner

```
     420      430       400   440                    450
410 {  IV.  ROUND THE WORLD   . . . . . . . . . . .   178
       V.   THE WAR PERIOD    . . . . . . . . . . .   248
       VI.  LAWRENCE vs. DANA . . . . . . . . . . .   282
```

ROUND THE WORLD. ~530

WHEN, on the 20th of July, 1859, Mr. Dana left his
                      .
                      .
                      .
              178
```

FIG. 5

PAGE CLASSIFIER ENGINE

BACKGROUND

The Internet has evolved into a communication medium capable of delivering virtually any type of media in electronic form. One particular media that is becoming increasingly digitized is the written word. Books, magazines, articles, and other publications are currently being stored as digital files that can easily be downloaded and viewed on electronic devices. No longer must consumers haul around paper copies of their favorite books. Now, they can peruse online libraries containing a vast quantity of digital publications.

Often, it is difficult to locate a digital form of a publication. Scanning publications using modern scanning devices is one method of creating an electronic version of a printed publication. During scanning, an image of one or more printed pages is extracted from the document and stored in a data file. Optical Character Recognition (OCR) software can then be applied to the data file to discern textual data from the scanned image(s). Traditional OCR software takes a digital image (such as a scanned book page) and determines whether the image contains any image regions, table regions, or text regions. For text regions, OCR software determines the bounding boxes of each line in the text region, the bounding boxes of each word in the line, and the most probable underlying meaning of each word. All of this information is stored in a file format proprietary to the OCR software. For example, OCR software developed by Abbyy® may store the above information as a unique extensible markup language (XML) file, named Abbyyxml. Another OCR-software company, Nuance, may store the information as a Nuance Xdoc file.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to classifying pages of an electronic document, such as a scanned book page. OCR software is applied to the contents of the electronic document, revealing, in one embodiment, semantic information about the content of the electronic document. Software-based features are applied to the semantic information to determine the type of page the electronic document is. Page types may include table of contents (TOC), index, table of figures (TOF), bibliography, epilogue, prologue, foreward, glossary, or other types of pages typically found in a book, magazine, or other publication. Once determined, the page type is assigned to the electronic document and stored for user by other software engines.

BRIEF DESCRIPTION OF THE DRAWINGS

The present invention is described in detail below with reference to the attached drawing figures, wherein:

FIGS. 4-7 are exemplary images portraying TOC and Index page types of electronic documents, in accordance with embodiments of the present invention.

DETAILED DESCRIPTION

Figure 1:
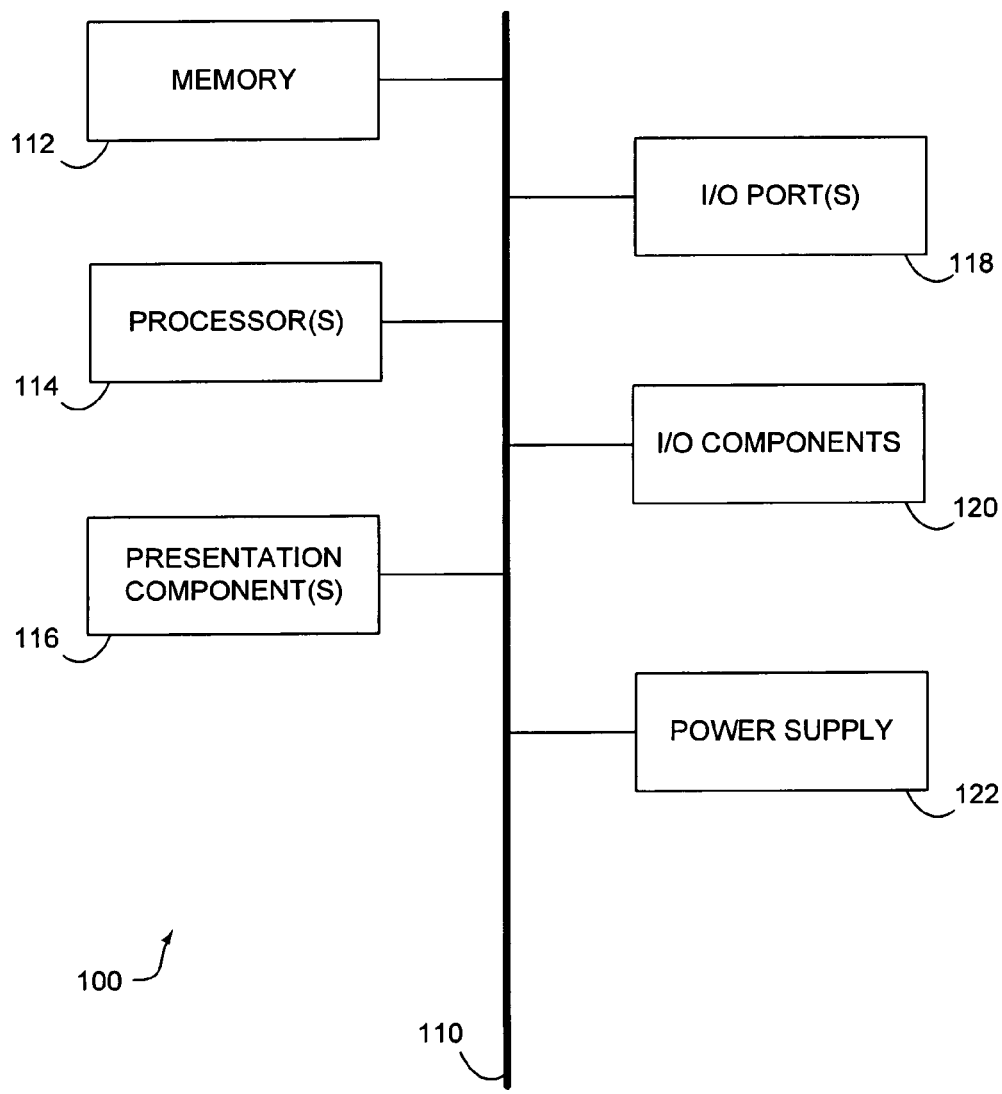
FIG. 1 is a block diagram of an exemplary computing environment suitable for use in implementing embodiments of the present invention.

The subject matter of the present invention is described with specificity herein to meet statutory requirements. The description itself is not intended, however, to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide computerized methods and systems, and computer-readable media having computer-executable instructions embodied thereon, for classifying an electronic document, or portion of an electronic document, as a particular type of page. Electronic documents may include, without limitation, scanned pages, or pages in an electronic format (e.g., the portable document format (PDF)). Books, magazines, or other documents may be stored in an electronic format, such as when they are scanned by a scanner. Software-implemented features are applied to semantic information associated with the electronic document that is stored in an OCR file to determine a particular page type of the electronic document.

Types of pages may include, for example but without limitation, a TOC, index, bibliography, table of figures, prologue, epilogue, glossary, foreward, or similar page. Embodiments described herein refer to the above types of pages; however, the invention is not limited thereto. Rather, similar page types may be determined by the embodiments described herein.

OCR software may be applied to electronic documents. The OCR software may identify semantic information for each page of an electronic document. Upon receiving textual data extracted from the electronic document, semantic information about the text on the page may be extracted through a series and stored as part of an OCR file. Semantic information, as referred to herein, may include the underlying meaning of text as well as the font, part of speech, language, size, position, page number, or the like. For example, semantic information about the word "tile" may include the definition of a floor covering. Or semantic information about a word that is bolded or underlined may designate that it was bolded and underlined.

Various features are applied to the underlying semantic information of text on a page in order to classify the page. These features, in some embodiment, are hand-tuned rules that are used to increment a score. In such embodiments, a page is classified as with a particular type when the score exceeds a threshold for a page type. In other embodiments, the features are applied and the classification of a page type occurs within a machine learning framework—i.e., without a developer specifying a threshold score or particular features. Such embodiments may employ networks in software using conditional random fields, Bayesian networks, or other automated networks generally well known to those skilled in the art.

Accordingly, in one embodiment, the present invention includes one or more computer-storage media having computer-executable instructions embodied thereon that, when executed, perform a method for classifying a page type of a portion of an electronic document. An OCR file associated with the portion of the electronic document is received; wherein, the OCR file includes semantic information about text in the portion of the electronic document. One or more features are applied to the semantic information. Based on the application of the one or more features to the semantic information, the page type of the portion of the electronic document can be determined. And once determined, an indication of the page type can be stored—for example, as metadata associated with the OCR file.

Another embodiment of the present invention is directed toward a method for determining a page type of a portion of an electronic document. An OCR file associated with the portion of the electronic document is received; wherein, the OCR file includes semantic information about text in the portion of the electronic document. A portion of the semantic information is analyzed by applying one or more features to the semantic information. Based on the application of the one or more features, a page type can be determined for the portion of the electronic document. And once determined, an indication of the page type can be stored.

Another embodiment of the present invention is directed toward a computerized method for storing an indication that an electronic document is a TOC page type. Semantic extracted from the electronic document is received; wherein, the semantic information includes an indication of the underlying meaning of one word. One or more features are applied to the semantic information. A determination that the electronic document is a TOC page type is then made based on the underlying meaning of the at least one word.

Having briefly described an overview of embodiments of the present invention, an exemplary operating environment suitable for implementing the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. Embodiments of the present invention may be practiced in a variety of system configurations, including hand-held devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
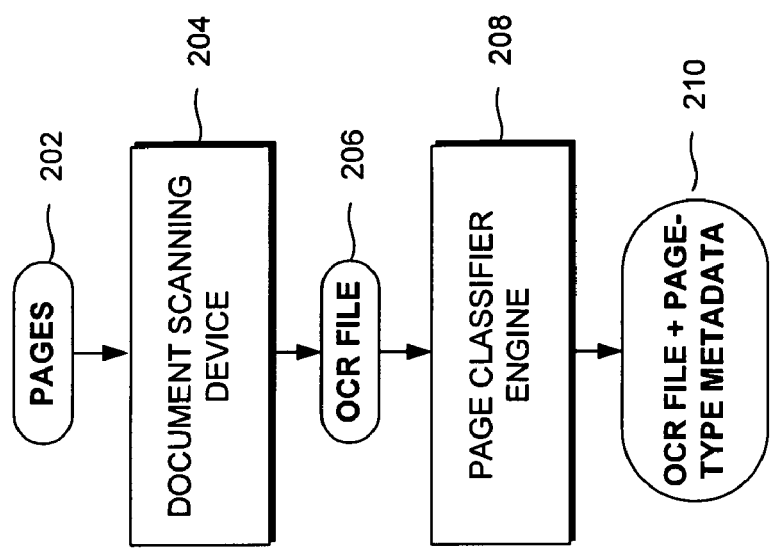
FIG. 2 is a block diagram of an exemplary page classifier engine configured to classify pages of a scanned publication, in accordance with an embodiment of the present invention.

Turning now to FIG. 2, a block diagram is illustrated showing an exemplary page classifier engine 208 configured to classify pages of a scanned document, in accordance with an embodiment of the present invention. It will be understood and appreciated by those of ordinary skill in the art that the page classifier engine 208 shown in FIG. 2 is merely an example of one suitable computing environment and is not intended to suggest any limitation as to the scope of use or functionality of the present invention. Furthermore, page classifying system 200 should not be interpreted as having any dependency or requirement related to any single component or combination of components illustrated therein. In one embodiment, the page classifying system 200 is incorporated into a stand-alone product, as part of a page classifying software package, as a part of a document layout extraction software package, or any combination thereof.

The page classifier engine 208 is implemented in software and may be made to run as a modular portion of a program. The page classifier engine 208 may be written in any well known programming language, such as C, C++, C#, Java, or the like. In one embodiment, one or more pages 202 are scanned by a document scanning device 204 (e.g., a scanner). OCR software produces an OCR file 206, which may be stored in a proprietary format (e.g., Abbyy XML or Nuance Xdoc) or converted into a new format (such as OCRML, developed by the Microsoft Corporation®).

The OCR file 206 may contain various information about the pages 202. Examples of the information include, without limitation, the portions of the pages 202 containing images, tables, figures, or text; the bounding boxes of each line within a text region; the bounding boxes of each word within a line of text; and indications of semantic information associated with each word or groups of words. One skilled in the art will appreciate that OCR files may include the aforementioned information as well as additional information, which need not be discussed at length herein.

The page-classifier engine 208 receives the OCR file 206 (or a file converted from the OCR file 206) and classifies each page based on the application of software-implemented features to the contents of the OCR file. In one embodiment, the features are software-implemented rules for adjusting a score based on the semantics of words in the electronic document. Once the score exceeds a particular page-type threshold, the page is classified according to the particular page type. For example, if a portion of a scanned document contains a header entitled "INDEX" that is bolded and underlined, the score may be incremented by 100. A threshold score for an index may be set at 90. As a result, the scanned page may be classified as an Index page.

In another embodiment, the features are applied as part of a machine learning framework. In such an embodiment, a threshold score is automatically set and adjusted base on previous classifications of pages. For example, if nearly every TOC page was classified as such based on the phrase TOC appearing in the top portion of a page, the machine learning network applies such history to future pages needing classification. As previously mentioned, one skilled in the art will appreciate that machine learning frameworks may include or incorporate Bayesian networks, neural networks, conditional random fields, or the like.

The page type, once determined by the page-classifier engine 208, is stored or associated with the OCR file as metadata. Metadata, as referred to herein, simply means data about data. One skilled in the art will appreciate that numerous methods may be employed to store or associate metadata with a page or OCR file. For example, an indication of the page type could be stored in the OCR file, or the indication could be stored separate from the OCR file.

The following features, or combination thereof, may be applied by the page-classifier engine 208 in order determine the page type of an electronic document. Weight may be given to key phrases found in the semantic information of an OCR file for the document. Examples of key phrases include, without limitation, "Table of Contents," "Contents," "Index," "General Index," "Table of Figures," "Figures," "List of Illustrations," "Illustrations," "Bibliography," "List of Authors," or the like. Virtually any keyword may be used to designate a page, increment a score of a page, or be learned from a machine learning network to classify or contribute to the classification of a page. Also, other semantic information may also be considered by the features, for example, a word or phrase's size, font, position on a page, page number, repletion upon a given page, or the like. In such an embodiment, the occurrence of different features are weighed differently to determine page type. One skilled in the art will appreciate that myriad semantic information may be considered by the features.

In one embodiment, the features for classifying a TOC page mine the semantic information of the OCR file 206, looking for key phrases, such as "Contents," "Table of Contents," "Chapter," "Page," etc. on a page. If such a phrase is found, the TOC score may be incremented by a relatively high score. If the key phrase is in a header of a page, it may be incremented with a relatively lower score. If only a partial match of the key phrase is located, the TOC score may be boosted by a somewhat smaller score. Numbers at the end of the lines in the OCR file are checked to see if they are listed vertically in ascending order—for example, when subsequent lines contain ascending numbers at the end of the lines after separators. If so, the TOC score is may be incremented. In such cases, both Arabic and Roman numbers may be checked. The TOC score may also be incremented based on the number of ordered arrays found following separators or TOC titles. Another increment to the TOC score may be based on how many numbers exist on a page or portion of a page relative to the number of lines in the page or portion of a page. The TOC score may be incremented when the page contains numerous lines with separators, and that incremented score may be relative to the number of lines on the page. In another embodiment, no TOC score is kept and the above features for incrementing the TOC score are applied to categorize the page as a TOC page. In such an embodiment, the occurrence of different features are weighed differently to determine page type. One skilled in the art will appreciate that numerous other features may alternatively or additionally be implemented.

Features for classifying a page as an index page may mine semantic information on a page or in a portion of a page, and figure an index score in the following manner. Key phrases, such as "Index," "General Index," etc., on a page can boost the index score. If the key phrase is in a header of a page, it may be incremented with a relatively lower score. Numbers at the end of each line on a page are checked to see whether the numbers are from the same line and/or whether the numbers create ordered arrays of numbers (i.e., sequential numbers listed on the same line), and, in some embodiments, the increments are dependent on the quantity of page numbers on a single line. Or numbers on descending lines may boost the index score if the numbers are descending (e.g., line 2 has page number 4 and line 4 has page number 2). Also, the index score may be incremented based on the quantity of page numbers are on the page compared to the number of lines. Moreover, the index score is incremented when the beginning letter of each line creates an alphabetic array of letters (e.g., A, B, C, D, etc.). In another embodiment, no index score is kept and the above features for incrementing the index score are applied to categorize the page as an index page. In such an embodiment, the occurrence of different features are weighed differently to determine page type. One skilled in the art will appreciate that numerous other features may alternatively or additionally be implemented.

Features for classifying a page as a bibliography page may mine semantic information on a page or in a portion of a page, and figure a bibliography score in the following manner. Key phrases, such as "Bibliography," "List of Authors," etc., on a page may increment the bibliography score with a relatively high increment. Or partial mappings of key phrases may also increment the bibliography score, but at a relatively lower increment. If the key phrase is in a header of a page, it may be incremented with a relatively lower score. The bibliography score may be incremented for each word containing a capital letter or for a page containing a large quantity of capitalized words. Years on a page (including designations of particular centuries or time periods) may increment the bibliography score. In another embodiment, no bibliography score is kept and the above features for incrementing the bibliography score are applied to categorize the page as a bibliography page. In such an embodiment, the occurrence of different features are weighed differently to determine page type. One skilled in the art will appreciate that numerous other features may alternatively or additionally be implemented.

Features determining TOF pages mine for semantic information on a page or in a portion of a page as well. Like the other engines, a TOF score may be kept and incremented in the following manner. Key phrases, such as "Illustrations," "List of Illustrations," Figures," "Table of Figures," etc., on a page may increment the TOF score with a relatively high increment. Or partial mappings of key phrases may also increment the TOF score at a relatively lower increment. If the key phrase is in a header of a page, it may be incremented with a relatively lower score. Similar scoring schemes as those described above with reference to the TOC, index, and bibliography engines may be employed in various embodiments. In another embodiment, no TOF score is kept and the above features for incrementing the TOF score are applied to categorize the page as a TOF page. In such an embodiment, the occurrence of different features are weighed differently to determine page type. One skilled in the art will appreciate that numerous other features may alternatively or additionally be implemented.

In one embodiment, if the TOC, index, bibliography, or TOF scores exceed threshold values—set either by a developer or a computer learning framework—the page or portion of the page is tagged as a TOC, index, bibliography, or TOF page, respectively. Such a classification may be stored in a computer-storage medium as metadata of an OCR file or within an actual OCR file.

Publications are typically organized in a sequential nature. In other words, the third page follows the second page, which follows the first page. Similarly, pages of particular page types tend to be presented sequentially as well. For example, a TOC that is four pages long is usually positioned in a publication such that the first TOC page precedes the second, the second precedes the third, and the third precedes the fourth. This may be factored into a feature in some embodiments. The feature may be configured to take into account the page type(s) on the preceding pages of an electronic publication. In one embodiment, the previous page's page type influences the score associated with a particular page. In this embodiment, if a page was designated as a particular page type (e.g., TOC page), the next page's score associated with that particular page type (TOC score) may automatically be incremented before analyzing any semantic information. In another embodiment, page-type classifications made by computer learning frameworks take into account the page type of a preceding page.

Features described herein may change over time—in other words, dynamic. Specifically, in some computer learning networks, historical classifications of page types may influence future classifications. For example, portions of an electronic document with the words "Table of Contents" are predominately classified as TOC portions or pages, features for classifying TOC pages may be manipulated to always classify future pages as TOC pages when such a phrase appears.

Figure 3:
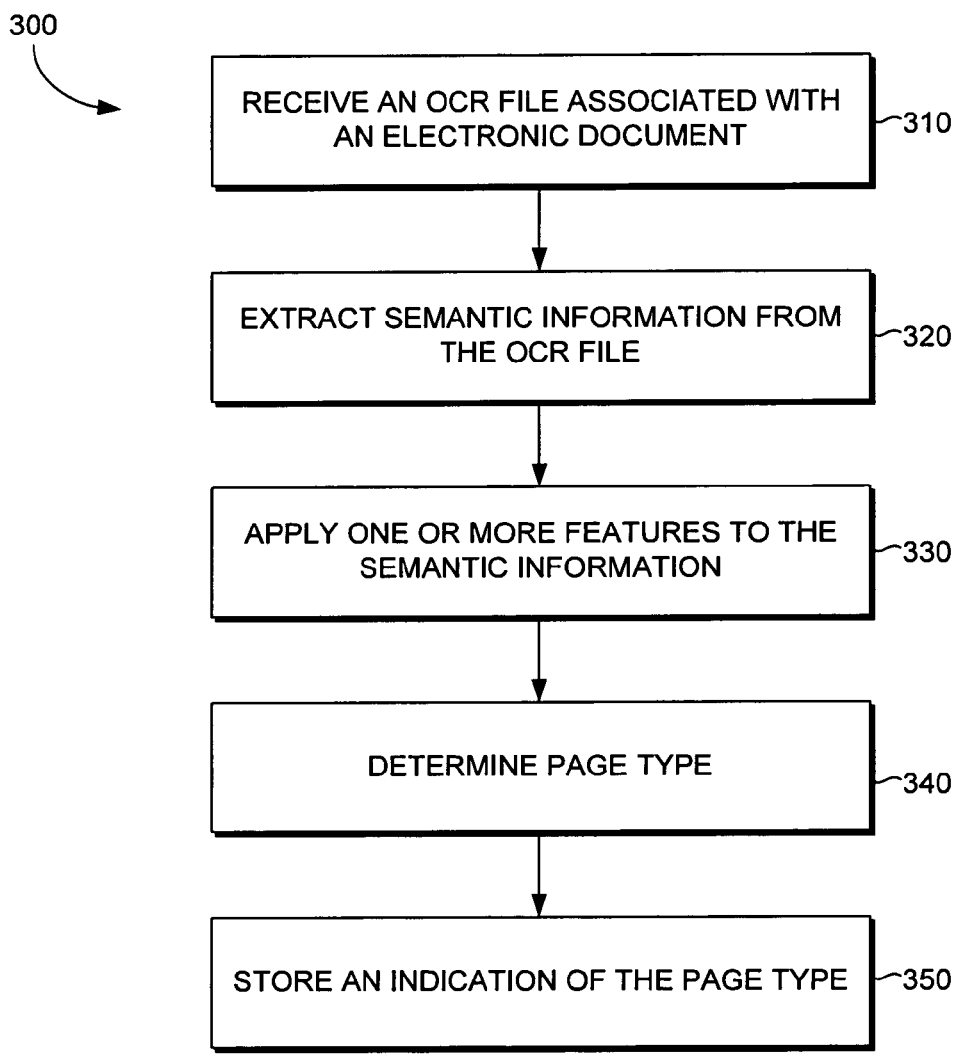
FIG. 3 is a flow diagram illustrating an exemplary method for assigning a page type to a portion of an electronic document, in accordance with an embodiment of the present invention.

FIG. 3 is a flow diagram illustrating an exemplary method 300 for assigning a page type to a portion of an electronic document, in accordance with an embodiment of the present invention. Initially, an OCR file is received by a computing device (such as computing device 100 or a server), as indicated at 310. The OCR file may contain semantic information for some or all portions of the electronic document. Semantic information may be extracted from the OCR file, as indicated at 320. Alternatively, semantic information may be sent to the computing device separate from the OCR file. One or more features may then be applied to the semantic information, as indicated at 330. Based on the application of the features to the semantic information, a page type may be determined, as indicated at 340. Once determined, an indication of the page type may be stored, as indicated at 350. Indications of page types may be any alphanumeric character, combination of characters, tags, or other well-known identification indicative of a TOC, TOF, index, bibliography, epilogue, foreward, glossary, or other type of page. The features described herein may be applied to any page types (e.g., preface, prologue, acknowledgments, etc.) in similar manners.

FIGS. 4-8 are exemplary images portraying TOC and Index page types of electronic documents, in accordance with embodiments of the present invention. FIG. 4 illustrates a portion 400 of an electronic document, in accordance with an embodiment of the invention. A TOC entry 410 forms in a single reference to a target section (part, chapter, line, words in a line, etc.) somewhere in the main body of the electronic document. In this instance, the TOC entry 410 includes on or more elements, as indicated by reference numerals 420, 430, 440, and 450, that make up the structure of the TOC entry 410. In embodiments, the elements 420, 430, 440, and 450 may be character strings. Based on the textual data associated with these character strings, the page-classifier engine 208 may identify each element as belonging to a particular classification. With continued reference to FIG. 4, the elements 420, 430, 440, and 450 may be classified as a "TOC number" (IV), "TOC title" (ROUND THE WORLD), "separator" ( . . . ), and "page number" (178), respectively.

Semantic information pertinent to the elements 420, 430, 440, and 450 are stored the OCR file produced from OCR software. Features take into account various semantic information in order to determine whether TOC entry 410 is in a TOC page type.

One possible feature for determining a page type is whether a TOC, Index, Bibliography, or TOF title can be found on the page number listed after a separator following the title. For example, finding TOC title 430 somewhere on page number 450 is strong evidence that TOC entry 410 is on a TOC page. To make such a determination, the page-classifier engine 208 may be configured to apply a feature that checks the semantic information associated with page number 450. And if TOC title 430 or TOC number 420 is found on page number 450, a feature may increment a score, manipulate metadata of an OCR file, or otherwise indicate the portion 400 is a TOC page type. Similar features applicable to an index, bibliography, TOF, or other page of the electronic document. In any such feature, the semantic information of particular page numbers may be searched for potential TOC, Index, Bibliography, TOF, or other page-type titles, figures, or text.

FIG. 5 illustrates a page 510 of an electronic document within a scanned book. The page 510 corresponds to page number 450 (i.e., page "178") in the electronic document. As illustrated in FIG. 5, a chapter title 520 and title 530 contains the same text as TOC number 420 and TOC title chapter 430, respectively.

Figure 6:
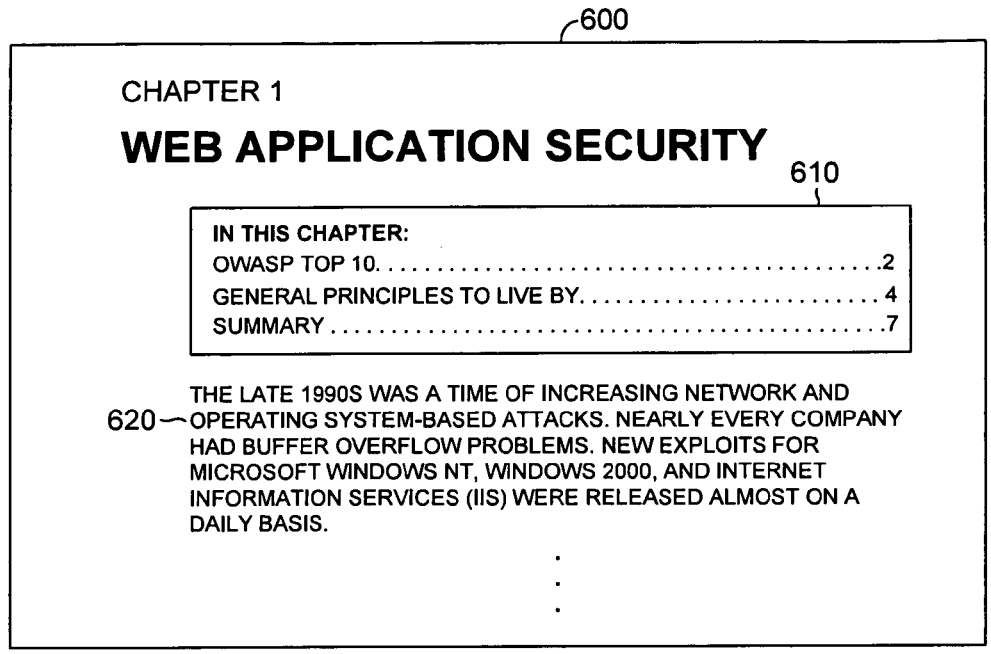

FIG. 6 further illustrates a TOC page type included within a portion 610 of an electronic document 600. The rest of the electronic document, indicated as text portion 620, contains a portion of the electronic document 600 that is not a TOC page type. Metadata can be manipulated to indicate that only the portion 610 is a TOC page type, while the text portion 620 is not.

Figure 7:
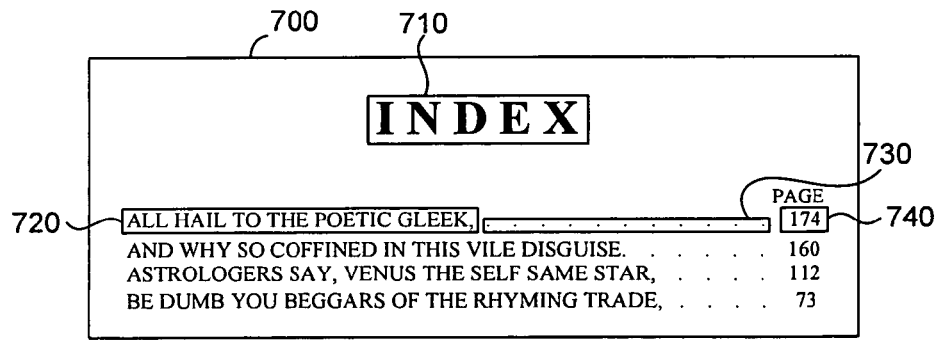

FIG. 7 illustrates a page 700 of an electronic document displaying an index page. The page 700 includes several elements, namely an index heading 710, index title 720, separator 730, and page number 740. Features described herein may be applied to the semantic information associated with each element in order to determine page 700 is, in fact, an index page. The index page type may be indicated with metadata associated with an OCR file.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A method for determining a page type of a first portion of an electronic document utilizing one or more second portions of the electronic document, comprising:
   receiving an OCR file associated with the electronic document, wherein the OCR file includes semantic information about text in the electronic document;
   analyzing the semantic information about the text in a first portion of the electronic document by applying one or more features to the semantic information, the one or more features comprising assigning a weight to the following: key phrases, a size of a word or phrase, font, a location of a word or phrase, one or more page numbers, and a repletion of a word or phrase in the first portion of the electronic document;
   using the semantic information about the text in the first portion of the electronic document to automatically reference a second portion of the electronic document;
   extracting semantic information about the text in the second portion of the electronic document;
   analyzing the semantic information about the text in the second portion of the electronic document by applying one or more features to the semantic information, the one or more features comprising determining that the second portion contains a page-type title, figure, or text similar to a page-type title, figure, or text in the first portion of the electronic document;
   determining the page type of the first portion of the electronic document based at least upon the application of the one or more features to the semantic information in the first portion of the electronic document and the application of the one or more features to the semantic information in the second portion of the electronic document; and
   storing an indication of the page type.

2. The method of claim 1, wherein the one or more features are software-implemented rules that have been determined by a machine learning network.

3. The method of claim 2, wherein the machine learning network includes at least one neural network.

4. The method of claim 2, wherein the machine learning network utilizes a Bayesian algorithm.

5. The method of claim 1, wherein the page type is indicative of at least one of a table of contents, table of figures, index, bibliography, foreword, epilogue, or prologue page.

6. One or more computer-storage memory having computer-executable instructions embodied thereon that, when executed by a computing device, perform a method for classifying a page type of a first portion of an electronic document, the method comprising:
   receiving an OCR file associated with the electronic document, wherein the OCR file includes semantic information about text in the electronic document;
   analyzing the semantic information about the text in a first portion of the electronic document by applying one or more features to the semantic information, the one or more features comprising assigning a weight to the following: key phrases, a size of a word or phrase, font, a location of a word or phrase, one or more page numbers, and a repletion of a word or phrase in the first portion of the electronic document;
   using the semantic information about the text in the first portion of the electronic document to automatically reference a second portion of the electronic document;
   extracting semantic information about the text in the second portion of the electronic document;
   analyzing the semantic information about the text in the second portion of the electronic document by applying one or more features to the semantic information, the one or more features comprising determining that the second portion contains a page-type title, figure, or text similar to a page-type title, figure, or text in the first portion of the electronic document;
   determining the page type of the first portion of the electronic document based at least upon the application of the one or more features to the semantic information in the first portion of the electronic document and the application of the one or more features to the semantic information in the second portion of the electronic document; and
   storing an indication of the page type.

7. The computer-storage memory of claim 6, wherein the one or more features are software-implemented rules that have been determined by a machine learning network.

8. The computer-storage memory of claim 6, wherein the machine learning network includes at least one neural network.

9. The computer-storage memory of claim 6, wherein the machine learning network utilizes a Bayesian algorithm.

10. The computer-storage memory of claim 6, wherein the page type is indicative of at least one of a table of contents, table of figures, index, bibliography, foreword, epilogue, or prologue page.

11. A system for classifying a page type of a first portion of an electronic document, the system comprising:
   a computing device associated with a page classifier engine having one or more processors and one or more computer-storage media; and
   a data store coupled with the page classifier engine,
   wherein the page classifier engine:
      receives an OCR file associated with the electronic document, wherein the OCR file includes semantic information about text in the electronic document;
      analyzes the semantic information about the text in a first portion of the electronic document by applying one or more features to the semantic information, the one or more features comprising assigning a weight to the following: key phrases, a size of a word or phrase, font, a location of a word or phrase, one or more page numbers, and a repletion of a word or phrase in the first portion of the electronic document;

uses the semantic information about the text in the first portion of the electronic document to automatically reference a second portion of the electronic document;

extracts semantic information about the text in the second portion of the electronic document;

analyzes the semantic information about the text in the second portion of the electronic document by applying one or more features to the semantic information, the one or more features comprising determining that the second portion contains a page-type title, figure, or text similar to a page-type title, figure, or text in the first portion of the electronic document;

determines the page type of the first portion of the electronic document based at least upon the application of the one or more features to the semantic information in the first portion of the electronic document and the application of the one or more features to the semantic information in the second portion of the electronic document; and stores an indication of the page type.

12. The system of claim 11, wherein the one or more features are software-implemented rules that have been determined by a machine learning network.

13. The system of claim 11, wherein the machine learning network includes at least one neural network.

14. The system of claim 11, wherein the machine learning network utilizes a Bayesian algorithm.

15. The system of claim 11, wherein the page type is indicative of at least one of a table of contents, table of figures, index, bibliography, foreword, epilogue, or prologue page.

* * * * *